United States Patent Office 2,812,256
Patented Nov. 5, 1957

2,812,256

SALIVA CONTROL COMPOSITION

Burton Nerfin, New York, N. Y.

No Drawing. Application July 6, 1953,
Serial No. 366,389

1 Claim. (Cl. 99—135)

This invention relates to saliva control compositions and is herein illustrated in some detail as embodied in chewable compositions adapted to selectively control the salivary glands to yield an alkaline saliva, and also provide a chewable substance that includes a somewhat resisted chewing motion in the jaw muscles, thus exercising the muscles to strengthen them.

According to the present disclosure, the composition may be adjusted to suit the exercising in chewing to suit the age of the patient while retaining adequate saliva control. Thus, eight year old children have a biting force of about 35 pounds on the back teeth; twelve year olds about 75 pounds; eighteen year olds 140 pounds; and adults 175 pounds.

The pH of normal human saliva varies between 5.75 and 7 under ordinary conditions. The pH often rises to 8.4 upon swallowing fruit juice, but often falls rapidly thereafter.

The enamel surface material of human teeth is not stable below pH 5.

It has also been known that meat eating primitive or semi-primitive people usually had good teeth, apparently because these people, including young children chewed relatively hard food, such as the seal meat of the Esquimaux.

Modern young children, fed with the "perfected" baby foods, have little practice in chewing, and as they grow older, live largely on soft breads, cooked cereals, fruit juices, hard but easily soluble candies, and other sweets, and eggs and milk, and cooked soft vegetables and meats.

Even older people fail to eat hard crusts of bread, carrots, celery, tough meats, and other foods which would adequately exercise the jaws and, incidentally, scrub the teeth with the fibers in the food.

The result is an inadequate use and exercise of the gingival tissue that overlie the alveola bone around the teeth. Moreover, the peridental fibers that hold the teeth to the bony sockets and the entire periodontium fail to get needed stimulation.

Minute food particles enmeshed and stagnating on the rough surface of the tongue, and the saliva under the tongue often become acidic, inducing dental caries.

Thus the ammoniated and other alkaline mouth washes and tooth pastes prove inadequate to reach every center of acid and thus fail to preserve the teeth, and, in fact, seem to provoke an acid rebound after using them. Moreover these temporary alkaline conditions are inadequate to prevent the deposit of mucin which deposits in placques at PH 4.58 and redissolves at pH 5.23.

Fruit juices and raw carrots often produce a temporary alkaline saliva, but that soon passes.

According to the present invention, the foregoing and other difficulties and objections are overcome, and a material is produced which brings about an increased alkaline saliva, thus having an alkaline reserve, without the need of introducing any extraneous alkali.

The material of the present invention is self-cohesive and resistant to chewing, unlike most modern chewing gums which yield easily in chewing and often fail to aid materially in cleansing the biting or occlusal surfaces of the teeth.

It is known that the parotid glands which discharge saliva near the molar teeth produce an alkaline saliva, often, if not always, and that the other salivary glands including the sub-lingual and sub-maxillary glands, produce a different saliva, or salivas, so the mixed saliva is a complex material. Apparently the present invention, selectively alters the flow of saliva from the various glands so as to obtain the desired alkaline saliva.

To attain these and other ends, the invention is herein disclosed as a chewable composition of matter, carrying substantial amounts of the natural resin known as gum mastic.

Gum mastic itself is frangible, hard and friable so that it breaks into pieces with sharp edges that cut the gums and cheeks and tongue when crushed between the teeth and attempted to be chewed.

Gum mastic, however, is easily miscible with numerous other substances, such as beeswax, various grades of paraffine wax, spermaceti, and ceresin, to yield a readily chewable mass that modifies the saliva so that it becomes alkaline even though acid, and remains alkaline for several hours hereafter.

The amount of wax, or other modifier, need not be large. Thus one part of soft paraffine wax melting at about 48° C. chewed with forty-one parts of mastic, yields a relatively hard but chewable mass, suitable to adequately exercise the jaw muscles of adults, capable, say, of exerting a pressure of 175 lbs. on the back teeth.

The proportion of the mastic may be reduced so that thirty parts of mastic are chewed to a chewable mass with one part of the same paraffine wax making a soft chewable mass, suitable for a child, say with a back tooth pressure of 35 pounds.

With that lot of paraffine, less than thirty parts of mastic and more than 41 parts of mastic proved non-chewable.

In these and other tests the mouth, to produce comparable results, was first rinsed with water at about 23.5° C. approximately room temperature.

A different paraffine wax, melting at about 52° C. yielded a hard chewable mass with thirty-one parts of mastic and a soft chewable mass with twenty-four parts of mastic, both to one part of the wax.

The softer samples of paraffine wax mixture proved friable when more than 41 parts of mastic were chewed with one part of the paraffine, and tacky and sticky to the teeth when less than 30 parts of mastic were chewed with one part of the paraffine wax.

The harder wax was satisfactory only between 31 parts of mastic and 24 parts of mastic, both to one part of the paraffine wax.

A white beeswax malting at 62° C. to 65° C. was satisfactory only between thirteen parts of mastic to one of the wax and twenty-five parts of the mastic to one part of the beeswax.

A white ceresin wax melting at 61° C. to 78° C. was satisfactory only between 21 parts of mastic to one part of ceresin and 35 parts of mastic to one part of ceresin.

A spermaceti wax melting at 42° C. to 50° C. was satisfactory only between 18 parts mastic to one part spermaceti and 25 parts mastic to one part spermaceti.

All the foregoing produced a lasting effect in causing the saliva to become alkaline to about 8.4 pH and remain alkaline for several hours, often eight hours or more.

Not all waxes are compatible with mastic in a way to be useful. Thus candelilla wax proved useless when attempted to be chewed together with the mastic. Cocoa butter also proved useless when tried as above.

It will be noted that the paraffine wax, the beeswax, the ceresine wax, and spermaceti, all were compatible with and miscible with mastic in a wide range of proportions to yield chewable materials with widely different resistance to chewing so that commercial chewing compositions may be variously made to fit any age, say from eight years to adult.

Commercially it is possible to supply pills or pellets with the ground or powdered mastic and wax in desired proportions, but it seems more practical to knead together, under water, if desired, the mastic and wax at a suitable temperature, say about 37° C. to 47° C. to obtain the desired lumps or pellets. It should be noted that the mastic seems to permanently lose in saliva control power if melted or boiled in water. Mastic in the form of "tears" seems the best for this invention.

If not overheated the mastic containing materials seem to retain their saliva controlling power through long periods of time, even though chewed every day.

These mastic containing materials tend to clean the tongue by reason of their astringent properties, increased saliva flow, and also by a physical quasi-sweeping action tend to reduce the accumulation of food and debris on the teeth.

All the desired effects are usually obtained by chewing the mastic containing materials for twenty minutes.

The best material for the saliva control composition so far found is the paraffine wax mixture illustrated above. Many other mixtures are more or less useful and some of these have been also illustrated above. A simple test of another material which may be a gum or a wax admixed with the mastic, will indicate whether the mastic-containing mixture is suitable or not, and will indicate whether a suitable alkaline reserve is created that will last a satisfactory length of time.

Having thus described certain embodiments of the invention in some detail, what is claimed is:

A composition consisting of one part of a wax selected from the group consisting of beeswax, paraffin wax, ceresin, and spermaceti, admixed with 13 to 41 parts of gum mastic unaltered by heat.

References Cited in the file of this patent
UNITED STATES PATENTS

| | | |
|---|---|---|
| 913,426 | Osborne et al. | Feb. 23, 1909 |
| 2,286,712 | Borglin | June 16, 1942 |

FOREIGN PATENTS

| | | |
|---|---|---|
| 105 | Great Britain | of 1912 |

OTHER REFERENCES

King: Am. Dispensatory, 8th ed., Cincinnati, 1870, pp. 648 and 649.

Forscher et al: J. A. D. A., Feb. 1954, pp. 134–139 (pp. 134 and 139 pertinent.)

The New International Encyclopedia, vol. IV, Dodd, Mead and Co., New York, 1902, p. 485.